United States Patent Office 3,337,608
Patented Aug. 22, 1967

3,337,608
PHENYLACETYLPHENYL CARBAMATES
Edward L. Schumann, Portage Township, Kalamazoo County, Mich., assignor to The Upjohn Company, Kalamazoo, Mich., a corporation of Delaware
No Drawing. Filed Mar. 18, 1963, Ser. No. 266,089
3 Claims. (Cl. 260—479)

This invention relates to new and useful chemical compounds and more particularly to phenylacetylphenyl carbamates which are useful as sedatives and anti-inflammatory agents.

The novel compounds of the present invention are represented by the following structural formulas:

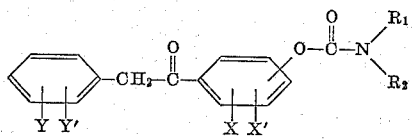

I and

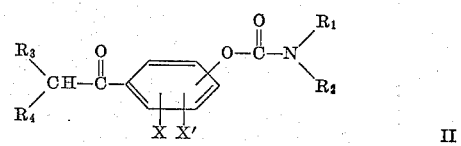

II wherein $R_1$ and $R_2$ taken individually represent a member selected from the group consisting of hydrogen, alkyl of from 1 to 4 carbon atoms, inclusive, and alkenyl of from 3 to 4 carbon atoms, inclusive, and taken together with —N< represent saturated heterocyclic amino selected from the group consisting of unsubstituted and mono- and polyalkyl substituted piperidino, morpholino, thiamorpholino, pyrrolidino, hexamethylenimino, heptamethylenimino, octamethylenimino, and homomorpholino wherein each alkyl is of from 1 to 4 carbon atoms, inclusive; each of X and Y is from zero to 3 alkoxys of from 1 to 2 carbon atoms, inclusive; X' is selected from the group consisting of from zero to 2 halogens and from zero to 2 alkyls of from 1 to 3 carbon atoms, inclusive; and Y' is selected from the group consisting of from zero to 1 halogen, from zero to 1 nitro, and from zero to 1 methyl; and $R_3$ and $R_4$ are selected from the group consisting of phenyl, tolyl, and methoxyphenyl.

Representative groups within the scope of the present invention include: alkyl, e.g., methyl, ethyl, propyl, isopropyl, butyl, and isobutyl; alkenyl, e.g., allyl, methallyl, and crotyl; halogen, e.g., fluoro, chloro, bromo, and iodo; saturated heterocyclic amino e.g., piperidino, morpholino, thiamorpholino, pyrrolidino, hexamethylenimino, heptamethylenimino, octamethylenimino, homomorpholino, 2-methylhexamethylenimino, 2,2 - dibutylhexamethylenimino, 3,6-dimethylhexamethylenimino, 2-ethylmorpholino, 2-ethyl-5-methylmorpholino, 3,3-dimethylmorpholino, 3-methylthiamorpholino, 2,3,5,6-tetramethylthiamorpholino, 2,3,6 - trimethylthiamorpholino, 2 - methylpiperidino, 3-methylpiperidino, 4-methylpiperidino, 2 - butylpiperidino, 2-propylpiperidino, 4-isopropylpiperidino, 3,4-diethylpiperidino, 2-sec.butylpyrrolidino, 2,2-dimethylpyrrolidino, 2-ethylpyrrolidino, 3,4-dimethylpyrrolidino, and 2-isopropylpyrrolidino; and alkoxy, e.g., methoxy and ethoxy.

The starting material for the preparation of the compounds of the present invention is a hydroxyacetophenone of the formula:

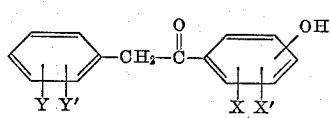

III and

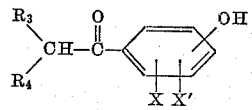

IV wherein $R_3$, $R_4$, X, X', Y, and Y' are as hereinbefore defined.

Compounds of the present invention of Formulas I and II wherein $R_1$ is hydrogen and $R_2$ is alkyl or alkenyl (i.e., monoalkyl- and monoalkenylcarbamates) are readily prepared by condensing a hydroxyacetophenone of the Formulas III and IV with an alkyl or alkenyl isocyanate, for example, methyl, ethyl, propyl, isopropyl, butyl, isobutyl allyl, and crotyl isocyanate, in the presence of an inert organic solvent, for example, diethyl ether, diisopropyl ether, dioxane, toluene, and the like. The reactants are preferably mixed in equimolar proportions, but, if desired, an excess of either reactant can be used. The reaction proceeds at temperatures between about 15° C. and about 125° C. and can be accelerated by adding a small amount of a base such as triethylamine. Illustratively, the carbamates are readily obtained in many instances by allowing the reaction mixture to stand overnight at about 25° C. The product is recovered by conventional means such as filtration, or concentration of the reaction mixture followed by filtration, washing and recrystallization.

The compounds of Formulas I and II are also prepared by reacting a compound of Formulas III and IV, preferably in the form of an alkali metal salt, e.g., sodium or potassium salt, with phosgene to form the corresponding chloroformate of the formulas:

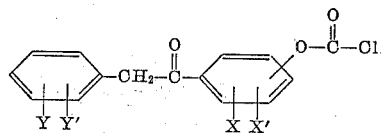

V and

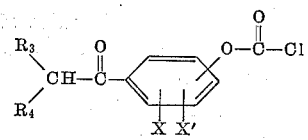

VI wherein $R_3$, $R_4$, X, X', Y, and Y' are as hereinbefore defined, and then reacting the chloroformate with ammonia, a monoalkylamine, a monoalkenylamine, a dialkylamine, a dialkenylamine, an alkylalkenylamine, or a saturated heterocyclic amine such as unsubstituted and mono- and polyalkyl substituted piperidine, morpholine, thiamorpholine, pyrrolidine, hexamethylenimine, heptamethylenimine, octamethylenimine, and homomorpholine wherein each alkyl is of from 1 to 4 carbon atoms, inclusive.

The chloroformate of Formulas V and VI is prepared by mixing a compound of Formulas III and IV, an aqueous solution of a base, for example, sodium or potassium hydroxide, and a solution of phosgene in an inert organic solvent, for example, toluene, benzene, diethyl ether, and the like. This reaction is exothermic and is advantageously carried out at temperatures between about −30° C. and about +30° C. The phosgene: organic solvent solution is added slowly and with mixing to prevent localized heating or undesirable temperatures above 30° C. The chloroformate, thus formed, accumulates in the organic phase and the aqueous phase is separated. The chloroformate can be isolated and purified by recrystallization or it can be used without further purification in the preparation of the carbamates of the present invention.

The reaction of an amine of the kind noted above and the chloroformate is carried out in the presence of a solvent, for example, water, diethyl ether, and dioxane. The reaction is advantageously carried out at temperatures in the range of about 10° C. to about 50° C. The rate of reaction is slow at temperatures below about 10° C.; and at temperatures above about 50° C., the ammonia or amine can volatilze and decomposition of the chloroformate intermediate or carbamate product can occur. Stoichiometrically, the reaction requires one mole of amine for each mole of chloroformate. However, the reaction produces one mole of hydrogen chloride, so an excess of the amine, preferably about at least one mole excess, or another suitable acid acceptor, for example, triethylamine, pyridine, picoline, sodium hydroxide, and the like should be employed. The carbamate product of Formula I or II is recovered by conventional methods, for example, filtering off any solids, removing the solvent, washing and recrystallization from a suitable solvent.

Alternatively, compounds of Formula I and II can be prepared by reacting a carbamyl halide, for example, dimethylcarbamyl chloride, propylcarbamyl chloride, and the like, with a hydroxyacetophenone having Formulas III and IV.

The starting hydroxyacetophenones of Formulas III and IV can be prepared by a Friedel-Crafts reaction between a phenol of the formula:

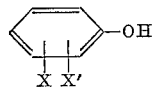

VII wherein X and X' are as hereinbefore defined, and an acid halide of the formula:

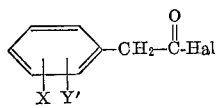

VIII and

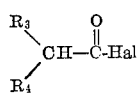

IX wherein Hal is chlorine or bromine, and $R_3$, $R_4$, Y, and Y' are as hereinbefore defined.

The following examples are illustrative of the preparation of compounds of the present invention but are not to be construed as limiting.

EXAMPLE 1

*4-phenylacetylphenyl methylcarbamate*

A solution of 21.2 g. of (0.1 mole) of 4'-hydroxy-2-phenylacetophenone in 300 ml. of anhydrous ether and 50 ml. of anhydrous acetone was treated with 5.7 g. (0.1 mole) of methyl isocyanate and 2 drops of triethylamine, then stirred overnight at about 25° C. Solvent was removed under reduced pressure and the solidified residue was recrystallized twice from methanol to give 9 g. of 4-phenylacetylphenyl methylcarbamate as white crystals which melted at 119–120° C.

*Analysis.*—Calcd. for $C_{16}H_{15}NO_3$: C, 71.36; H, 5.62; N, 5.20. Found: C, 71.20; H, 5.63; N, 5.30.

EXAMPLE 2

*2-bromo-4-fluoro-6-phenylacetylphenyl ethylcarbamate*

Following the procedure of Example 1, but substituting 3'-bromo-5'-fluoro-2'-hydroxy-2-phenylacetophenone for the 4'-hydroxy-2-phenylacetophenone and ethyl isocyanate for methyl isocyanate, 2-bromo-4-fluoro-6-phenylacetylphenyl ethylcarbamate is obtained.

EXAMPLE 3

*2-(4-iodophenylacetyl)phenyl ethylcarbamate*

Following the procedure of Example 1, but substituting 2'-hydroxy-2-(4-iodophenyl)acetophenone for the 4'-hydroxy-2-phenylacetophenone and ethyl isocyanate for methyl isocyanate, 2-(4-iodophenylacetyl)phenyl ethylcarbamate is obtained.

EXAMPLE 4

*2-chloro-4-phenylacetylphenyl propylcarbamate*

Following the procedure of Example 1, but substituting 3'-chloro-4'-hydroxy-2-phenylacetophenone for the 4'-hydroxy-2-phenylacetophenone and propyl isocyanate for methyl isocyanate, 2-chloro-4-phenylacetylphenyl propylcarbamate is obtained.

EXAMPLE 5

*2-fluoro-6-iodo-4-phenylacetylphenyl isopropylcarbamate*

Following the procedure of Example 1, but substituting 3'-fluoro-4'-hydroxy-5'-iodo-2-phenylacetophenone for the 4'-hydroxy-2-phenylacetophenone and isopropyl isocyanate for methyl isocyanate, 2-fluoro-6-iodo-4-phenylacetylphenyl isopropylcarbamate is obtained.

EXAMPLE 6

*2,3-dimethoxy-6-phenylacetylphenyl isopropylcarbamate*

Following the procedure of Example 1, but substituting 3',4'-dimethoxy-2'-hydroxy-2-phenylacetophenone for the 4'-hydroxy-2-phenylacetophenone and isopropyl isocyanate for methyl isocyanate, 2,3-dimethoxy-6-phenylacetylphenyl isopropylacarbamate is obtained.

EXAMPLE 7

*3,5-dimethoxy-4-(4-methoxyphenylacetyl)phenyl butylcarbamate*

Following the procedure of Example 1, but substituting 2',6'-dimethoxy-4'-hydroxy-2-(4-methoxyphenyl)acetophenone for the 4'-hydroxy-2-phenylacetophenone and butyl isocyanate for methyl isocyanate, 3,5-dimethoxy-4-(4-methoxyphenylacetyl)-phenyl butylcarbamate is obtained.

EXAMPLE 8

*4-(4-methoxyphenylacetyl)phenyl isobutylcarbamate*

Following the procedure of Example 1, but substituting 4'-hydroxy-2-(4-methoxyphenyl)acetophenone for the 4'-hydroxy-2-phenylacetophenone and isobutyl isocyanate for methyl isocyanate, 4-(4-methoxyphenylacetyl)phenyl isobutylcarbamate is obtained.

EXAMPLE 9

*5-methoxy-2-(4-nitrophenylacetyl)phenyl allylcarbamate*

Following the procedure of Example 1, but substituting 2'-hydroxy-4'-methoxy-2-(4-nitrophenyl)acetophenone for the 4'-hydroxy-2-phenylacetophenone and allyl isocyanate for methyl isocyanate, 5-methoxy-2-(4-nitrophenylacetyl)phenyl allylcarbamate is obtained.

EXAMPLE 10

*2-isopropyl-4-methoxy-5-methyl-6-phenylacetylphenyl crotylcarbamate*

Following the procedure of Example 1, but substituting 2'-hydroxy-3'-isopropyl-5'-methoxy-6'-methyl-2-phenylacetophenone for the 4'-hydroxy-2-phenylacetophenone and crotyl isocyanate for methyl isocyanate, 2-isopropyl-4-methoxy-5-methyl-6-phenylacetylphenyl crotylcarbamate is obtained.

EXAMPLE 11

*2-phenylacetylphenyl dimethylcarbamate*

A. *2-phenylacetylphenyl chloroformate.*—42.4 grams (0.2 mole) of 2'-hydroxy-2-phenylacetophenone and 8.0 grams (0.2 mole) of sodium hydroxide are added to 150 ml. of water. To this aqueous solution is added a solution of 19.8 grams (0.2 mole) of phosgene in 120 ml. of toluene, prepared by bubbling phosgene into toluene at −10° C. The phosgene:toluene solution is added slowly with mechanical stirring while maintaining the temperature below 25° C. The reaction mixture is stirred for 1.5 hours and filtered to remove solids. The aqueous layer is separated from the organic layer in a separatory funnel and the organic layer washed with 200-ml. portions of 5% aqueous potassium hydroxide solution. The toluene solution is washed with water until neutral and then dried over anhydrous sodium sulfate. The toluene is removed by distillation under reduced pressure to leave 2-phenylacetylphenyl chloroformate as a residue.

B. *2 - phenylacetylphenyl dimethylcarbamate.*—To a solution of 27.4 grams (0.1 mole) of 2-phenylacetylphenyl chloroformate in 200 ml. of anhydrous diethyl ether is added 9.0 grams (0.2 mole) of dimethylamine dissolved in 100 ml. of anhydrous ether. The reaction flask is stirred during the addition to prevent localized heating. The reaction mixture is allowed to stand overnight during which time a precipitate forms. The precipitate is removed by filtration and the ether by means of distillation under reduced pressure to provide 2-phenylacetylphenyl dimethylcarbamate.

EXAMPLE 12

*3,5-dimethoxy-4-(4-methoxyphenylacetyl)-2-methylphenyl carbamate*

Following the procedure of Example 11, Part A, substituting 2′,6′ - dimethoxy-4′-hydroxy-2-(4-methoxyphenyl)-3′-methylacetophenone for the 2′-hydroxy-2-phenylacetophenone, the respective chloroformate is obtained. Following the procedure of Part B, commencing with 3,5-dimethoxy - 4 - (4-methoxyphenylacetyl)-2-methylphenyl chloroformate and substituting ammonia for dimethylamine, 3,5 - dimethoxy-4-(4-methoxyphenylacetyl)-2-methylphenyl carbamate is obtained.

EXAMPLE 13

*2,3-dimethoxy-6-(3,4-dimethoxyphenylacetyl)-phenyl methylallylcarbamate*

Following the procedure of Example 11, Part A, substituting 3′,4′ - dimethoxy - 2-(3,4-dimethoxyphenyl)-2′-hydroxyacetophenone for the 2′-hydroxy-2-phenylacetophenone, the respective chloroformate is obtained. Following the procedure of Part B, commencing with 2,3-dimethoxy-6-(3,4-dimethoxyphenylacetyl)phenyl chloroformate and substituting methylallylamine for dimethylamine, 2,3-dimethoxy - 6 - (3,4-dimethoxyphenylacetyl)phenyl methylallylcarbamate is obtained.

EXAMPLE 14

*3,5-diethoxy-2-(3-ethoxy-5-methoxyphenylacetyl)-phenyl methylethyl carbamate*

Following the procedure of Example 11, Part A, substituting 2′,4′ - diethoxy-2-(3-ethoxy-5-methoxyphenyl)-6′-hydroxyacetophenone for the 2′-hydroxy-2-phenylacetophenone, the respective chloroformate is obtained. Following the procedure of Part B, commencing with 3,5-diethoxy - 2-(3-ethoxy-5-methoxyphenylacetyl)phenyl chloroformate and substituting methylethylamine for dimethylamine, 3,5 - diethoxy-2-(3-ethoxy-5-methoxyphenylacetyl)phenyl methylethylcarbamate is obtained.

EXAMPLE 15

*5-methoxy-2-(3-chloro-2,4,6-trimethoxyphenylacetyl) phenyl dicrotylcarbamate*

Following the procedure of Example 11, Part A, substituting 2-(3-chloro-2,4,6-trimethoxyphenyl)-2′-hydroxy-4′-methoxyacetophenone for the 2′-hydroxy-2-phenylacetophenone, the respective chloroformate is obtained. Following the procedure of Part B, commencing with 5-methoxy-2 - (3-chloro-2,4,6-trimethoxyphenylacetyl)phenyl chloroformate and substituting dicrotylamine for dimethylamine, 5 - methoxy - 2 - (3-chloro-2,4,6-trimethoxyphenylacetyl) phenyl dicrotylcarbamate is obtained.

EXAMPLE 16

*4-methyl-2-phenylacetylphenyl tetramethylenecarbamate*

Following the procedure of Example 11, Part A, substituting 2′-hydroxy-5′-methyl-2-phenylacetophenone for the 2′-hydroxy-2-phenylacetophenone, the respective chloroformate is obtained. Following the procedure of Part B, commencing with 4-methyl-2-phenylacetylphenyl chloroformate and substituting pyrrolidine for dimethylamine, 4 - methyl-2-phenylacetylphenyl tetramethylenecarbamate is obtained.

EXAMPLE 17

*3-methyl-4-phenylacetylphenyl pentamethylenecarbamate*

Following the procedure of Example 11, Part A, substituting 4′-hydroxy-2′-methyl-2-phenylacetophenone for the 2′-hydroxy-2-phenylacetophenone, the respective chloroformate is obtained. Following the procedure of Part B, commencing with 3-methyl-4-phenylacetylphenyl chloroformate and substituting piperidine for dimethylamine, 3-methyl-4-phenylacetylphenyl pentamethylenecarbamate is obtained.

EXAMPLE 18

*2-fluoro-4-phenylacetylphenyl hexamethylenecarbamate*

Following the procedure of Example 11, Part A, substituting 3′-fluoro-4′-hydroxy-2-phenylacetophenone for the 2′-hydroxy-2-phenylacetophenone, the respective chloroformate is obtained. Following the procedure of Part B, commencing with 2-fluoro-4-phenylacetylphenyl chloroformate and substituting hexamethylenimine for dimethylamine, 2-fluoro-4-phenylacetylphenyl hexamethylenecarbamate is obtained.

EXAMPLE 19

*2-(2,5-dimethoxyphenylacetyl)-3,4,5-trimethoxyphenyl heptamethylenecarbamate*

Following the procedure of Example 11, Part A, substituting 2 - (2,5 - dimethoxyphenyl)-6′-hydroxy-2′,3′,4′-trimethoxyacetophenone for the 2′-hydroxy-2-phenylacetophenone, the respective chloroformate is obtained. Following the procedure of Part B, commencing with 2-(2,5-dimethoxyphenylacetyl) - 3,4,5-trimethoxyphenyl chloroformate and substituting heptamethylenimine for dimethylamine, 2-(2,5-dimethoxyphenylacetyl)-3,4,5-trimethoxyphenyl heptamethylenecarbamate is obtained.

EXAMPLE 20

*3,5-diethoxy-2-(4-ethoxyphenylacetyl)-4-methoxyphenyl octamethylenecarbamate*

Following the procedure of Example 11, Part A, substituting 2′,4′ - diethoxy-2-(4-ethoxyphenyl)-6′-hydroxy-3′-methoxyacetophenone for the 2′-hydroxy-2-phenylacetophenone, the respective chloroformate is obtained. Following the procedure of Part B, commencing with 3,5-diethoxy-2-(4-ethoxyphenylacetyl)-4-methoxyphenyl chloroformate and substituting octamethylenimine for dimethylamine, 3,5 - diethoxy - 2-4-ethoxyphenylacetyl)-4-methoxyphenyl octamethylenecarbamate is obtained.

EXAMPLE 21

*4-(4-ethoxyphenylacetyl)phenyl (1,1-dimethyltetramethylene)carbamate*

Following the procedure of Example 11, Part A, substituting 2-(4-ethoxyphenyl)-4′-hydroxyacetophenone for the 2′-hydroxy-2-phenylacetophenone, the respective chloroformate is obtained. Following the procedure of Part B, commencing with 4-(4-ethoxyphenylacetyl)phenyl chloroformate and substituting 2,2-dimethylpyrrolidine for dimethylamine, 4-(4-ethoxyphenylacetyl)phenyl (1,1-dimethyltetramethylene)carbamate is obtained.

EXAMPLE 22

*3,5-diethoxy2-(4-ethoxy-3-methoxyphenylacetyl)phenyl (1-methylpentamethylene)carbamate*

Following the procedure of Example 11, Part A, substituting 2',4'-diethoxy-2-(4-ethoxy-3-methoxyphenyl)-6'-hydroxyacetophenone for the 2'-hydroxy-2-phenylacetophenone, the respective chloroformate is obtained. Following the procedure of Part B, commencing with 3,5-diethoxy - 2 - (4 - ethoxy-3-methoxyphenylacetyl)phenyl chloroformate and substituting 2-methylpiperidine for dimethylamine, 3,5-diethoxy-2-(4-ethoxy-5-methoxyphenylacetyl)phenyl (1-methylpentamethylene)carbamate is obtained.

Using the following hydroxyacetophenones in Examples 1 thru 22, the corresponding carbamatees are obtained:

3'-bromo-5'-fluoro-4'-hydroxy-2-phenyl-,
3'-chloro-5'-fluoro-2'-hydroxy-2-phenyl-,
4'-chloro-2'-hydroxy-2-phenyl-,
5'-chloro-2'-hydroxy-2-phenyl-,
4',6'-dimethoxy-2-(2,3-dimethoxyphenyl)-2'-hydroxy-,
4',6'-dimethoxy-2'-hydroxy-2-(2-methoxyphenyl)-,
4',6'-dimethoxy-2'-hydroxy-2-(4-methoxyphenyl)-,
4',6'-dimethoxy-2'-hydroxy-2-(4-methoxyphenyl)-2'-methyl-,
4',6'-dimethoxy-2'-hydroxy-2-(2-methoxyphenyl)-3'-methyl-,
2',4'-dimethoxy-6'-hydroxy-2-(4-methoxyphenyl))-3'-methyl-,
2',4'-dimethoxy-6'-hydroxy-2-(2-methoxyphenyl)-3'-methyl-,
4',6'-dimethoxy-2'-hydroxy-3'-methyl-2-(4-nitrophenyl)-,
4',6'-dimethoxy-2'-hydroxy-3'-methyl-2-phenyl-,
3',4'-dimethoxy-2'-hydroxy-2-phenyl-,
4',5'-dimethoxy-2'-hydroxy-2-phenyl-,
5',6'-dimethoxy-2'-hydroxy-2-phenyl-,
5'-fluoro-2'-hydroxy-2-phenyl-,
3'-hydroxy-5'-isopropyl-6'-methoxy-2'-methyl-2-phenyl-,
2'-hydroxy-4'-methoxy-2-(2-methoxyphenyl)-,
2'-hydroxy-4'-methoxy-2-(4-methoxyphenyl)-,
6'-hydroxy-2-(2-methoxyphenyl)-2',3',4'-trimethoxy-,
2'-hydroxy-5'-methoxy-2-phenyl-,
2'-hydroxy-6'-methoxy-2-phenyl-, and
2'-hydroxy-4'-methoxy-2-phenylacetophenones.

In following the procedures of Examples 11 thru 22 with the above hydroxyacetophenones, the corresponding chloroformates are also obtained.

EXAMPLE 23

*4-diphenylacetylphenyl methylcarbamate*

A mixture of 28.8 g. (0.1 mole) of 4'-hydroxy-2,2-diphenylacetophenone, 250 ml. of toluene, 5.7 g. (0.1 mole) of methyl isocyanate, and 3 drops of triethylamine was heated under reflux for 5 hr., then refrigerated. The mixture was filtered to remove unreacted starting material and the filtrate was evaporated to dryness under reduced pressure. Recrystallization of the residue from chloroform-technical hexane, twice from ethyl acetate-technical hexane, and again from chloroform-technical hexane gave 10.3 g. of 4-diphenylacetylphenyl methylcarbamate as soft white needles, M.P. 104–105° C.

EXAMPLE 24

*2-(di-p-tolylacetyl)phenyl methylcarbamate*

Following the procedure of Example 23, substituting 2,2 - di - p-toyl-2'-hydroxyacetophenone for the 2,2-diphenyl - 4' - hydroxyacetophenone, 2 - (di-p-tolylacetyl) phenyl methylcarbamate is obtained.

EXAMPLE 25

*2-diphenylacetylphenyl methylcarbamate*

Following the procedure of Example 23, substituting 2,2 - diphenyl - 2' - hydroxyacetophenone for the 2,2-diphenyl-4'-hydroxyacetophenone, 2-diphenylacetylphenyl methylcarbamate is obtained.

EXAMPLE 26

*2-(di-4-methoxyphenylacetyl)-5-methoxyphenyl methylcarbamate*

Following the procedure of Example 23, substituting 2,2 - di - 4 - methoxyphenyl-2'-hydroxy-4'-methoxyacetophenone for the 2,2-diphenyl-4'-hydroxyacetophenone, 2-(di-4-methoxyphenylacetyl)-5-methoxyphenyl methylcarbamate is obtained.

EXAMPLE 27

*4-phenylacetylphenyl (3-oxapentamethylene)-carbamate*

Following the procedure of Example 11, Part A, substituting 4'-hydroxy-2-phenylacetophenone for 2'-hydroxy - 2-phenylacetophenone, the respective chloroformate is obtained. Following the procedure of Part B, commencing with 4-phenylacetylphenyl chloroformate and substituting morpholine for dimethylamine, 4-phenylacetylphenyl (3-oxapentamethylene)-carbamate is obtained.

EXAMPLE 28

*4-phenylacetylphenyl (3-thiapentamethylene)-carbamate*

Following the procedure of Example 27, Part B, commencing with 4-phenylacetylphenyl chloroformate and substituting thiamorpholine for morpholine, 4-phenylacetylphenyl (3-thiapentamethylene)carbamate is obtained.

EXAMPLE 29

*4-phenylacetylphenyl (3-oxahexamethylene)carbamate*

Following the procedure of Example 27, Part B, commencing with 4-phenylacetylphenyl chloroformate and substituting homomorpholine for morpholine, 4-phenylacetylphenyl (3-oxahexamethylene)carbamate is obtained.

Following the procedures of Examples 3, 4, 5, 7, 8, 9, and 10, substituting the hydroxyacetophenones employed therein by 2,2-diphenyl-4'-hydroxyacetophenone, 2,2-diphenyl - 2' - hydroxyacetophenone, 2,2-di-p-tolyl-2'-hydroxyacetophenone, and 2,2-di-4-methoxyphenyl-2'-hydroxy-4'-methoxyacetophenone, the corresponding ethyl, propyl, isopropyl, butyl, isobutyl, allyl, and crotylcarbamates are obtained.

Following the procedure of Example 11, Part A, substituting the 2'-hydroxy-2-phenylacetophenone by 2,2-diphenyl-4'-hydroxyacetophenone, 2,2 - diphenyl - 2' - hydroxyacetophenone, 2,2-di-p-tolyl - 2' - hydroxyacetophenone, and 2,2-di-4-methoxyphenyl-2'-hydroxy-4' - methoxyacetophenone, the corresponding 4-diphenylacetylphenyl, 2 - diphenylacetylphenyl, 2 - (di-p-tolylacetyl) phenyl, and 2-(di-4-methoxyphenylacetyl) - 5 - methoxyphenyl chloroformates are obtained, which by the procedures of Part B of Examples 12, 11, 13, 14, 15, 16, 17, 18, 19, 20, 21, 22, and 27, and Examples 28 and 29, are converted to the corresponding unsubstituted carbamates and dimethyl-, methylallyl-, methylethyl-, dicrotyl-, tetramethylene-, pentamethylene-, hexamethylene-, heptamethylene-, octamethylene-, (1,1-dimethyltetramethylene)-, (1-methylpentamethylene)-, (3-oxapentamethylene)-, (3-thiapentamethylene)-, and (3-oxahexamethylene)carbamates.

The compounds of the invention have demonstrated anti-inflammatory activity as shown by the granuloma pouch technique in rats.

The compounds of the present invention (Formulas I and II) are useful in the preparation of a variety of pharmaceutical compositions. Preferably the compositions are prepared in unit dosage form, i.e., each unit containing a predetermined amount of the therapeutic compound of the present invention, for oral, parenteral and topical administration. For oral administration the compositions can take the form of tablets, capsules, boluses, pills, powders, granules, feeds, syrups, elixirs, and the like. Topical administration can be in the form of ointments, creams, lotions, solutions, suspensions, sprays, and powders. For parenteral administration sterile solutions and suspensions can be prepared in vehicles containing water, ethanol, glycerol, propylene glycol, polyalkylene glycols, vegetable oils, and the like.

The compositions, in the appropriate form, can be administered orally and parenterally for systemic treatment, or topically such as on the skin, or locally such as for treating mastitis in cattle, or parenterally for local treatment such as injection into the joint cavity, tendon sheath, and bursa.

The compositions provide the veterinarian with a method for treating inflammation in large and small animals as well as birds and poultry. The animals and birds can be commercial animals raised for profit as well as animals kept for pets or research. Inflammatory conditions which can be treated include, but are not limited to, enteritis, iritis, retained placenta, laminitis, rheumatoid and traumatic arthritis, osteoarthritis, periostitis, tendonitis, tenosynovitis, bursitis, and myositis.

The dosage of the compounds of the present invention depends upon the particular subject treated and the subject's age, weight and condition, as well as the particular condition being treated, its severity and route of administration. In general a dose of 3 mg. to 45 mg. per kg. of body weight given daily in single or divided doses, or 250 to 3000 mg. per day, embraces the effective therapeutic dosage for most conditions for which the said compounds are effective.

Advantageously the compounds of the present invention do not have the undesirable side-effects encountered with steroid and other types of anti-inflammatory agents. For example, there is no marked water, sodium or potassium retention nor is there the development of gastric ulceration or other distress.

The following examples illustrate the preparation of pharmaceutical dosage forms but are not to be considered as limiting.

EXAMPLE 30

One thousand scored tablets for oral administration, each containing 500 mg. of 4-phenylacetylphenyl methylcarbamate are prepared from the following types and amounts of ingredients:

| | Gm. |
|---|---|
| 4-phenylacetylphenyl methylcarbamate | 500 |
| Lactose | 150 |
| Corn starch | 65 |
| Magnesium stearate | 25 |
| Light liquid petrolatum | 3 |

The ingredients are thoroughly mixed and slugged. The slugs are broken down by forcing through a screen and the resulting granules are then compressed into tablets, each tablet containing 500 mg. of 4-phenylacetylphenyl methylcarbamate.

Following the above formulation, 100 boluses for large animal use are similarly prepared, by enlarging the tablet size ten times, each bolus containing 5000 mg. of 4-phenylacetylphenyl methylcarbamate.

EXAMPLE 31

One thousand cc. of a sterile aqueous suspension for parenteral administration and containing 250 mg. of 4-phenylacetylphenyl methyl carbamate per cc. is prepared from the following types and amounts of ingredients:

| 4-phenylacetylphenyl methylcarbamate | gm | 250 |
|---|---|---|
| Polyethylene glycol 4000, U.S.P. | gm | 30 |
| Procaine hydrochloride | gm | 20 |
| Myristyl gamma picolinium chloride | gm | 0.2 |
| Water for injection, q.s. | cc | 1000 |

EXAMPLE 32

One thousand cc. of an aqueous syrup suspension for oral administration containing 500 mg. of 4-phenylacetylphenyl methylcarbamate in each 5 cc. dose is prepared from the following types and amounts of ingredients:

| 4-phenylacetylphenyl methylcarbamate | gm | 100 |
|---|---|---|
| Citric acid | gm | 2 |
| Benzoic acid | gm | 1 |
| Sucrose | gm | 700 |
| Tragacanth | gm | 5 |
| Oil of lemon | cc | 2 |
| Deionized water, q.s. | cc | 1000 |

The citric acid, benzoic acid, sucrose, tragacanth, and oil of lemon are dispersed in sufficient water to make 850 cc. of solution. The carbamate, finely divided, is stirred into the syrup until uniformly distributed. Sufficient water is added to make 1000 cc.

The syrup can be administered to small animals, 60 to 100 lb., at a teaspoonful dosage. For large animals such as a horse, one to two fluid ounces of the composition can be diluted with milk or water to make 12 fluid ounces administered as a drench.

EXAMPLE 33

500 lbs. of a composition for feeding turkeys with enteritis are prepared from the following types and amounts of ingredients:

| 4-phenylacetylphenyl methylcarbamate | gm | 75 |
|---|---|---|
| Ground oats | lb | 30 |
| Meat and bone scraps 50%* | lb | 30 |
| Fish meal 60%* | lb | 20 |
| Alfalfa meal, dehydrated 17%* | lb | 30 |
| Ground corn | lb | 158 |
| Wheat bran | lb | 15 |
| Wheat std. midds. | lb | 30 |
| Soybean oil meal 50%* | lb | 150 |
| Dicalcium phosphate | lb | 9.5 |
| Calcium carbonate | lb | 14 |
| Trace mineralized salt | lb | 2.5 |
| Yellow fat | lb | 10 |
| Vitamin D premix | lb | 0.3 |
| B-vitamin supplement | lb | 0.45 |
| Trace mineral supplement | lb | 0.3 |

* The percentages refer to the percent of protein present.

EXAMPLE 34

Following the procedures of Examples 30 to 33, inclusive, compositions are similarly prepared substituting an equal amount of a compound prepared according to Examples 2 to 29, inclusive, for the 4-phenylacetylphenyl methylcarbamate shown.

What is claimed is:

1. A compound selected from the group consisting of compounds of the formula:

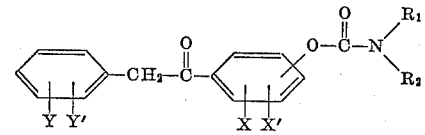

and of the formula:

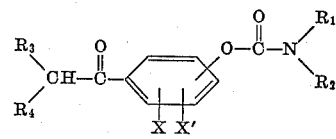

wherein $R_1$ and $R_2$ taken individually represent a member selected from the group consisting of hydrogen, alkyl of from 1 to 4 carbon atoms, inclusive, and alkenyl or from 3 to 4 carbon atoms, inclusive, and taken together with —N< represent saturated heterocyclic amino selected from the group consisting of unsubstituted and mono- and polyalkyl substituted piperidino, morpholino, thiamorpholino, pyrrolidino, hexamethylenimino, heptamethylenimino, octamethylenimino, and homomorpholino wherein each alkyl is of from 1 to 4 carbon atoms, inclusive; each of X and Y is from zero to 3 alkoxys of from 1 to 2 carbon atoms, inclusive; X' is selected from the group consisting of from zero to 2 halogens and from zero to 2 alkyls of from 1 to 3 carbon atoms, inclusive; Y' is selected from the group consisting of from zero to 1 halogen, from zero to 1 nitro, and from zero to 1 methyl; and $R_3$ and $R_4$ are selected from the group consisting of phenyl, tolyl, and methoxyphenyl.

2. 4-phenylacetylphenyl methylcarbamate.
3. 4-diphenylacetylphenyl methylcarbamate.

References Cited

UNITED STATES PATENTS

| | | | |
|---|---|---|---|
| 2,370,570 | 2/1945 | Muskat | 260—463 |
| 2,455,652 | 12/1948 | Bralley et al. | 260—463 X |
| 2,485,550 | 10/1949 | Aeschlimann et al. | 260—479 |
| 2,524,185 | 10/1950 | Zima | 260—479 |
| 2,677,698 | 5/1954 | Deutschman et al. | 260—479 |
| 2,787,631 | 4/1957 | Stevens | 260—463 |
| 2,855,436 | 10/1958 | Rekker. | |
| 2,858,328 | 10/1958 | Beaver et al. | |
| 2,873,291 | 2/1959 | Spiegler | 260—463 |
| 2,903,478 | 9/1959 | Lambrech | 260—479 |
| 2,906,614 | 9/1959 | Hopkins et al. | 260—463 X |
| 2,937,119 | 5/1960 | Berger et al. | 260—463 X |
| 2,967,880 | 1/1961 | Finke et al. | 260—463 X |
| 3,012,068 | 12/1961 | Shulgin | 260—479 |
| 3,062,868 | 11/1962 | Moore et al. | 260—479 |
| 3,091,633 | 5/1963 | Strube | 260—479 |
| 3,203,972 | 8/1965 | Schumann | 260—479 |

OTHER REFERENCES

Barnes et al.: Journal of Pharmacy and Pharmacology, vol. 13, pp. 39–48 (1961).

Brostoff et al.: Journal of Pharmacy and Pharmacology, vol. 13, pp. 65–71 (1961).

Dinglinger: Justus Liebig's Annalen der Chemie, vol. 311, pp. 147–153 (1900).

Hodgson et al.: Biochimica et Biophysica Acta, vol. 42, pp. 184–186 (1960).

LORRAINE A. WEINBERGER, *Primary Examiner.*

CHARLES B. PARKER, RICHARD K. JACKSON, *Examiners.*

F. D. HIGEL, I. R. PELLMAN, *Assistant Examiners.*